United States Patent [19]

Tsujioka et al.

[11] Patent Number: 4,887,227
[45] Date of Patent: Dec. 12, 1989

[54] IMAGE INPUT PROCESSOR

[75] Inventors: Hiroshi Tsujioka, Nara; Shigeo Yoneda, Yamatokoriyama; Yasuhumi Yatsuzuka, Nara, all of Japan

[73] Assignee: Sharp Kabushiki Kaisha, Osaka, Japan

[21] Appl. No.: 110,470

[22] Filed: Oct. 20, 1987

[30] Foreign Application Priority Data

| Oct. 20, 1986 | [JP] | Japan | 61-249828 |
| Oct. 20, 1986 | [JP] | Japan | 61-250404 |
| Oct. 20, 1986 | [JP] | Japan | 61-250405 |
| Oct. 20, 1986 | [JP] | Japan | 61-250409 |
| Oct. 20, 1986 | [JP] | Japan | 61-250410 |
| Oct. 20, 1986 | [JP] | Japan | 61-250411 |

[51] Int. Cl.⁴ .......................................... G06F 15/626
[52] U.S. Cl. ................................ 364/519; 382/9
[58] Field of Search .................. 364/519, 521, 522; 400/73; 382/9, 48, 61; 340/750, 792, 801

[56] References Cited

U.S. PATENT DOCUMENTS

| 3,201,752 | 8/1965 | Rabinow | 382/9 |
| 3,525,074 | 8/1970 | Cutaia | 382/9 |
| 4,087,790 | 5/1978 | Neff | 382/9 |
| 4,334,274 | 6/1982 | Agui et al. | 382/9 |
| 4,365,234 | 12/1982 | Henrichon, Jr. | 382/9 |
| 4,527,283 | 7/1985 | Ito et al. | 382/9 |
| 4,528,692 | 7/1985 | Umeda et al. | 382/9 |
| 4,627,002 | 12/1986 | Blum et al. | 364/519 |

Primary Examiner—A. D. Pellinen
Assistant Examiner—A. Jonathan Wysocki
Attorney, Agent, or Firm—Birch, Stewart, Kolasch & Birch

[57] ABSTRACT

An image input processor having a detector which detects whether or not the rate of the width of a character or characters are cut off from the read character information with respect to the readable width being over a predetermined value. Also, the image input processor has a printer which prints the cut-off character or characters when the detected rate is over the predetermined value, and prohibits printing of the cut-off character or characters when the detected rate is less than the predetermined value. Whereby necessary information and unnecessary information can be distinguished from each other based on the degree of the read image information that is cut off.

8 Claims, 20 Drawing Sheets

Fig. 2(a)
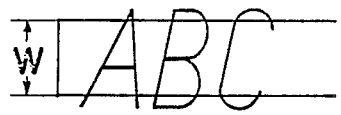
Fig. 2(b)
ABC
Fig. 3(a)
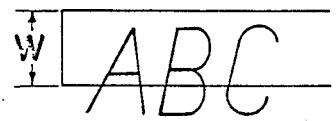
Fig. 3(b)
ARC
Fig. 4(a)
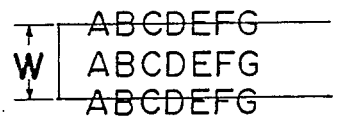
Fig. 4(b)
ABCDEFG

→　　ABCDEFGH
　　　　　　　　　　　　　　　　ABCDEFGH

→　　A B C D E F G

→　　ABCDEFGH
　　　　　　　　　　　　　　　　ABCDEFGH

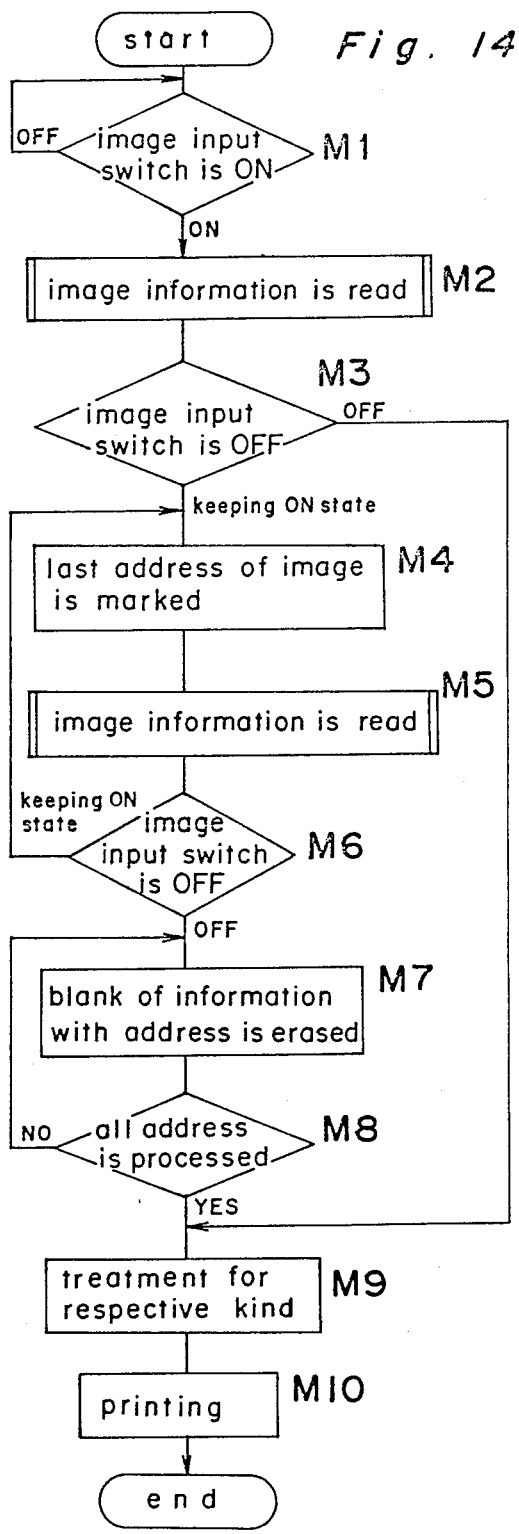

ABCDEFG

HIJK

ABCDEFGHIJK

ABCDEFG    HIJK

Fig. 27
informant      n. TSUCHISHA, HOKOKUSHA (Japanese)
information     n. TSUCHI, HOKOKU, JOHO, CHISHIKI, KENBUN
                                                                  (Japanese)
information processing system
        n. JOHO SHORI SOSHIKI (JOHO O SHORISURU
          computer KARA NARU SOSHIKI) (Japanese)
Fig. 28
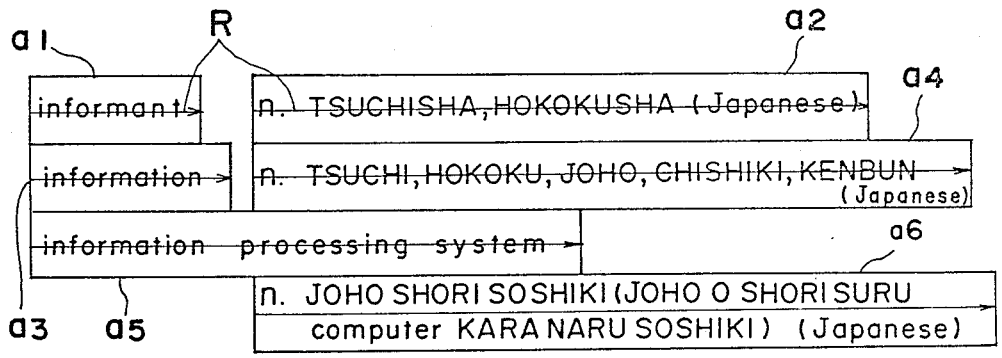
Fig. 29
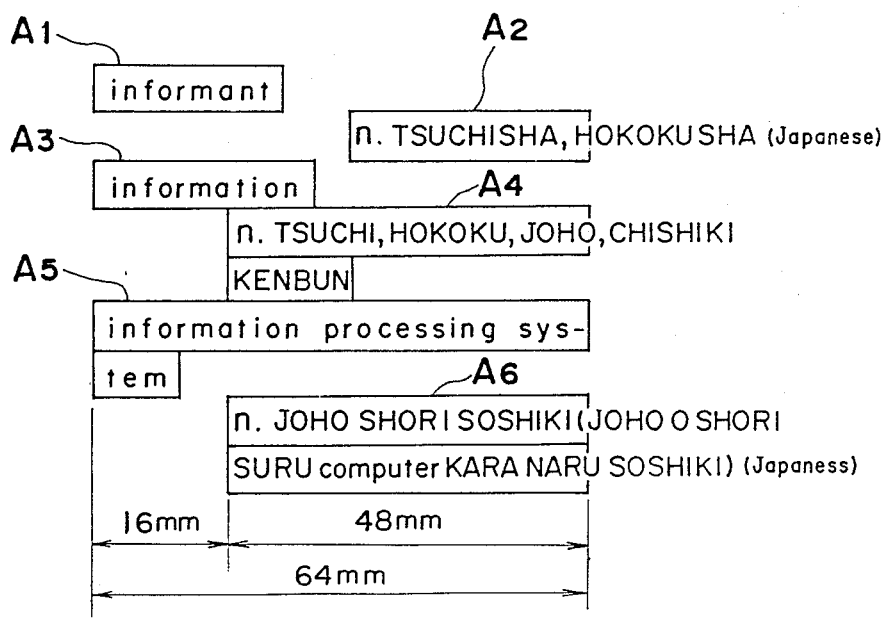

Fig. 42
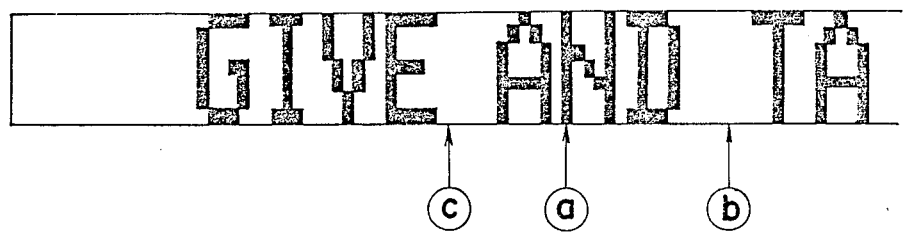
　　　　　　　　　　ⓒ　ⓐ　ⓑ
Fig. 43
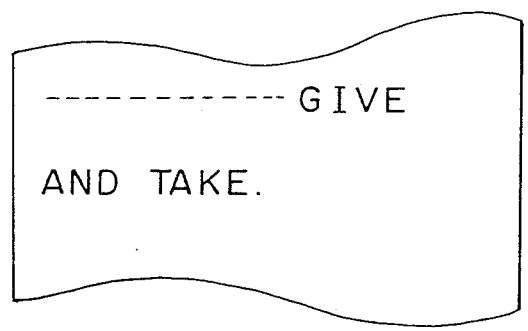
---------- GIVE AND TAKE.
Fig. 44
---------GIVE AND TAKE
Fig. 45
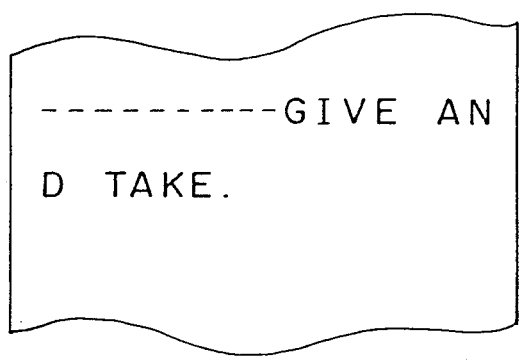
----------GIVE AN D TAKE.

IMAGE INPUT PROCESSOR

BACKGROUND OF THE INVENTION

1. Field of the Invention

The present invention relates to an image input processor which is arranged to read print and image information.

2. Description of the Prior Art

In a conventional image input processor, character information within a readable width W of the processor as shown in FIG. 9(a) or 10 (a) was printed as it was, to read as shown in FIG. 9(b) or 10(b). On the other hand, when the character information exceeded the readable width W, only the characters included in the readable width W were printed as shown in FIG. 11, and the characters exceeding the readable width W were not printed.

As described above, the conventional image input processor was arranged so that characters not included in the readable width W are not printed. In this case, it does not matter that the objective character information was positioned approximately in the center of the readable width W because positioning the character information beyond the readable width W was not necessary. However, as shown in FIGS. 12 and 13, when the aimed character information was partially beyond the readable width W and was accordingly not printed, the intended character information disappears, bringing about an inconvenience from the aspect of image reading.

Further, in the case where the character information exists in two lines, as shown in FIG. 16 was read by this kind of the image processor, a reader unit was moved on the character information from left to right as indicated by an arrow a of FIG. 17. In this case, if the reader unit overran the first line after having read characters "ABCDEFG" on the first line, the reader unit read the blank after the characters, and then read the second line "HIJK". Therefore, even if the desired output was a sequence of characters in one line as shown in FIG. 18, the characters were actually printed in the manner as shown in FIG. 19, reading "ABCDEFG" and "HIJK", with the blank or space therebetween. Thus, the desired output could not be obtained, creating an image reading problem.

When the aimed character information having a length that exceeds a fixed printing width as shown in FIG. 25 was desired to be printed, the character information should be divided by the printing width for printing in more than two lines. Therefore, it might take place that a character of the character information maybe divided halfway into two lines as shown in FIG. 26. Thus, a disadvantageous occurs in that the desired output cannot be obtained in some cases.

Generally, in the image input processor of this kind, the read image information always starts printing from the left end of the printing width of every line. For example, when making a wordbook, it would be good and considerably convenient to see that a word was printed at the left side of a line, and that a translated term of the word was printed at the right side of the next line. In the conventional processor, however, because all the information was arranged to be printed from the left end of every line, the printed output was hard to see.

The image input processor of this kind was generally provided with a detection device, such as a rotary encoder, to detect the moving amount of an image sensor. When the detection device detects the movement of the image sensor by manual operation, the data reader unit is driven to start reading of the data. Simultaneously with this detection, the read data is stored in a memory corresponding to the detection position by the detection device.

Meanwhile, the detection device referred to above has been improved in recent years to be highly precise in analyzing efficiency in order to enhance the detecting ability. Therefore, when an operator holds an input unit, namely, the image sensor onto the data surface so as to start reading, the operator thinks that he or she is holding the image sensor still, even through the slightest movement of the image sensor is detected by the detection device because of high analyzing precision. Thereby, reading of the data is started and unnecessary data is input.

The conventionally used reader unit includes a scanner for reading data by a sensor, and a printer for printing the read data. Supposing, for example, that a sentence, as shown in FIG. 44, is read by the scanner to be printed out, it might be undesirably brought about that a word in the sentence (AND in FIG. 45) is divided due to the limit of the printing width of the printer so that the sentence makes no sense.

SUMMARY OF THE INVENTION

A first object of the present invention is to provide an improved image input processor which is provided with a detector for detecting whether or not the rate of the width of a character or characters cut off from the read character information with respect to the readable width is over a predetermined value, and a printer for printing the cut-off character or characters when the detected rate is over the predetermined value, and prohibits to the printing of the cut-off character or characters when the detected rate is less than the predetermined value.

Accordingly, in the image input processor of the first embodiment of the present invention, necessary and unnecessary information can be distinguished from each other by the degree of how much the read image information is cut off. Thereby, necessary information is printed as it is read, and unnecessary information is not printed.

A second object of the present invention is to provide an improved image input processor of the type referred to above which is provided with a memory for storing an address of a memory which loads the last of the character information read up to the moment, and a removing device for removing blank information between the last address stored in the memory and the next to the last character information.

Accordingly, when the character information in more than two lines is read and printed out, the reader unit may overrun the first line, and read the second line. As a result, the character information on the first line and second line can be printed out in succession without a blank.

A third object of the present invention is to provide an improved image input process of the type referred to above which is provided with a detector for detecting whether the read character information is longer or shorter than a predetermined printing width, a searching device for searching for the largest space in the character information from the right end of the printing width within a given area when the read character information is longer than the printing width, and a printer for altering a line at the above-searched space for printing out the character information.

Accordingly, in the image input processor of the present invention, when the length of the read character information exceeds the printing width, the line is altered at the largest space within a fixed area from the right end of the printing width.

A fourth object of the present invention is to provide an improved image input processor of the type referred to above which is provided with a first detector for detecting whether reading of the character information is at an odd timing number or at an even timing number, and printer for printing the image information which is detected by the first detector to be read at the odd timing number or at the even timing number from the left end of the printing width of a line, and the image information detected by the first detector to be read at the even timing number or at the odd timing number in order to end at the right end of the printing width of a line.

Accordingly, the image input processor of the fourth embodiment of the present invention is arranged so that the image information is read at an odd timing number or at an even timing number and the image information is printed from the left end of the printing width of a line, while the image information read at an even timing number or at an odd timing number is printed in order to end at the right end of the printing width of a line.

A fifth object of the present invention is to provide an improved image input processor of the type described above which is provided with an image sensor manually driven on data surface, a detector in the image sensor for outputting a detection pulse corresponding to the movement of the image sensor, a data reader also in the image sensor for optically reading data on the data surface when the detection pulse is outputted, a counter for counting the number of detection pulse, a write control unit which outputs a write instruction signal when the number counted by the counter reaches a set value, and a memory for storing the data taken out from the data reader in response to the write instruction signal from the write control unit.

Accordingly, according to the image input processor of the fifth object of the present invention, when the image sensor is put onto the data surface at the start position for reading data, if the image sensor moves even slightly, the detector detects the movement of the image sensor, and outputs detection pulses. Since the detection pulses are not generated in succession at this time, the counter number of the counter does not reach the set value, and the write control unit does not output write instruction signals. As a result, unnecessary data read by the data reader is not stored in the memory.

A sixth object of the present invention is to provide an improved word processing system which is provided with a space detector for detecting space from the data read by a scanner, and a space judging device which, by setting the space width so as to distinguish the space between words from the space between characters in a word, judges that the space width detected by the space detector is a space between words when the space width detected by the space detector is larger than the set space width. The word processing system further includes a scanner for reading data, a printer for printing the read data, and a line controller for controlling the space detector in order to detect the last space between words of the data in a line, so that the line is changed at the detected space at the time of printing by the printer.

Generally, the space width between adjacent two words is sufficiently larger than the space width between characters in a word. Therefore, if the space width is set beforehand by which the space width between words and the space width between characters in a word are distinguished from each other, and the space width detected by the space detector is compared with the set space width, the space between adjacent two words can be detected. Moreover, the data between two adjacent spaces between words can be treated as one block forming a word.

BRIEF DESCRIPTION OF THE DRAWINGS

These and other objects and features of the present invention will become clear from the following description taken in conjunction with the preferred embodiments thereof with reference to the accompanying drawings, in which:

FIGS. 2–4 are views showing the pattern of oringnal of character information and character information of the printed output, respectively;

FIGS. 14 and 15 are flow-charts showing the operational procedure in an image input processor according to a second embodiment of the present invention;

FIGS. 27 and 28 are views showing the content of an original to be processed by an image input processor according to a fourth embodiment of the present invention;

FIG. 29 is a view showing the pattern of the printed output in the processor according to the fourth embodiment of the present invention;

FIG. 42 is a view of the data read according to the word processing system of the sixth embodiment of the present invention;

FIG. 43 is a view of one example of the printed output in the word processing system according to the sixth embodiment of the present invention;

FIG. 44 is a view of a sentence which is an object for reading; and

FIG. 45 is a view of one example of the printed output in a conventional art.

DETAILED DESCRIPTION OF THE PREFERRED EMBODIMENTS

Figure 1:
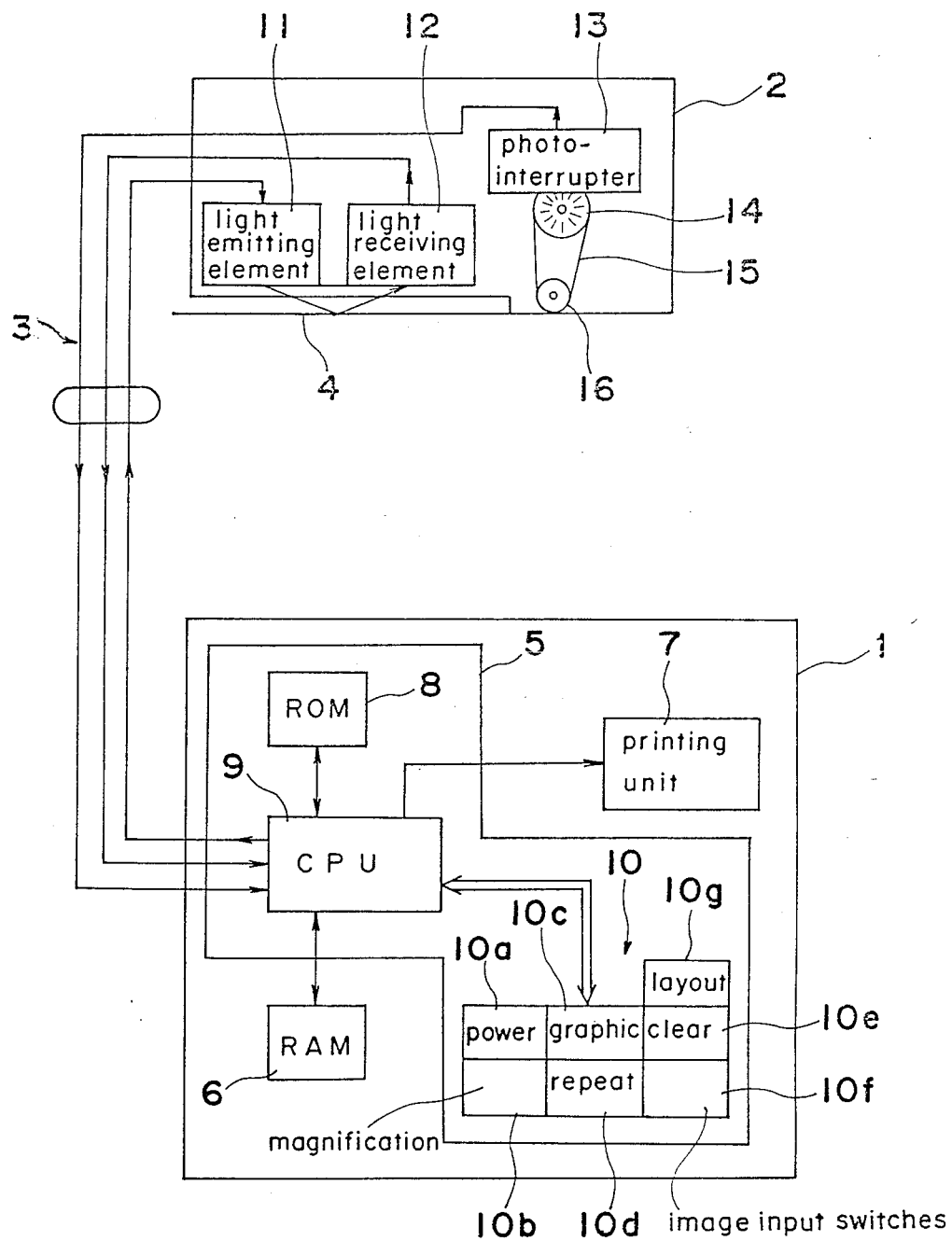
FIG. 1 is a block diagram showing the structure of an image input processor according to a first embodiment of the present invention.

Before the description of the present invention proceeds, it is to be noted that like parts are designated by like reference numerals throughout the accompanying drawings.

FIRST EMBODIMENT

Referring to an image input processor according to a first embodiment of the present invention shown in FIG. 1, a main body 1 includes a control unit 5, a RAM 6 and a printing unit 7. The control unit 5 is provided with the ROM 8, CPU 9 and a group of switches 10. The switch group 10 includes a power switch 10a for turning on and off power supply to the entire processor, a magnification switch 10b for turning on and off the output mode according to which information of an original 4 is magnified twice as large as the original, a graphic switch 10c for switching the graphic mode into the word mode or vice versa, a repeat switch 10d for re-printing the image information previously outputted, a clear switch 10e for erasing the image information stored in the RAM 6, an image input switch 10f for turning on and off the reading of an image, and a layout switch 10g for turning on and off the layout mode. An image reader unit 2 is provided with a light emitting element 11, a light receiving element 12, a photo-interrupter 13, a disc 14 having slits formed in a radial direction thereof, a belt 15 and a roller 16. A connection line 3 connects the 9 of the main body 1 to the light emitting element 11, the light receiving element 12 and the photo-interrupter 13 of the image reader unit 2. It is to be noted that it is not necessary for every one of the switches 10a–10g to be installed in the main body 1, and a part of the switch group 10 may be provided in the image reader unit 2. In addition, the image reader unit 2 and the main body 1 may be integrally formed into one body.

The operation of the image input processor according to the first embodiment of the present invention will be described.

First, in a general operation mode, the power switch 10a is turned on, while the magnification switch 10b, the graphic switch 10c and the layout switch 10g are turned off. The switches 10d, 10e and 10f are self-return switches. When the image reader unit 2 is slid on the original 4, while the image input switch 10f is depressed, the roller 16 that is in contact with the original 4 is rotated. The rotation of the roller 16 is transmitted to the disc 14 by way of the belt 15. An intermittent signal is generated as a result of the rotation of the disc 14 is is inputted to the CPU 9 which then controls the light emitting element 11 to emit light. The light emitted by the light emitting element 11 is reflected by the original 4 and is detected by the light receiving element 12, so that the image information is inputted. The image information is stored in the RAM 6 through the CPU 9 as dot image data. When the image input switch 10f is not depressed or the RAM 6 has no room for data storage, inputting of an image is completed.

When the image input is completed, the CPU 9 starts to process the image information stored in the 6 in accordance with the selection of the switches 10a–10g of the switch group 10. The details for processing the image information will be described later. After completing the processing of image information, the processed image information is sent to the printing unit 7 and is printed out on a paper.

The read image information will be processed in the following.

FIGS. 2(a), 3(a) and 4(a) show an image information of an original, and FIGS. 2(b), 3(b) and 4(b) show a pattern of the printed information read out of the original.

In FIG. 2, the upper and lower parts of the image information of the original protrude beyond the readable width W. In this case, since the image information is larger than the readable width W, the read image information is printed as it is, with the upper and lower parts thereof being cut off. Referring to FIG. 3, the lower part of the image information exceeds the readable width W. Since the height of the read image information is over half the readable width W, the read image information is printed as it is, without the lower part being printed. In other words, in the examples of FIGS. 2 and 3, the image information of the original is necessary to be read out. Accordingly, the read image information is printed as it is read although the information is partially cut off.

On the other hand, in the example of FIG. 4, because of the blanks within half the readable width W, parts of the image information between the blank and, the upper and lower ends of the readable width W are not printed. In other words, the upper and lower unnecessary information is not printed.

Figure 5:
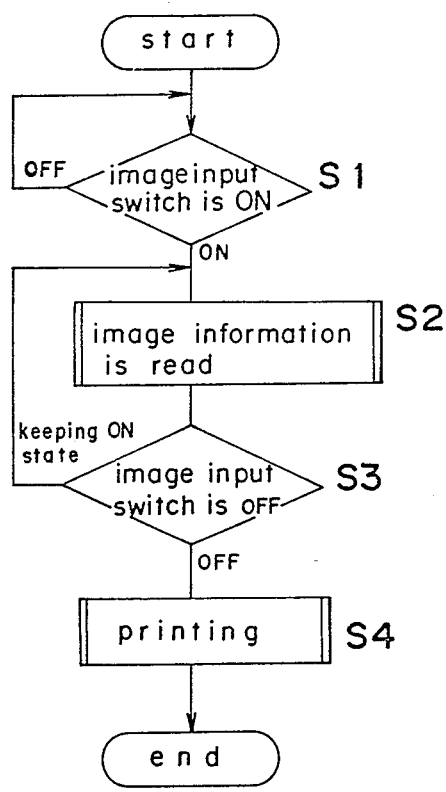
FIGS. 5–8 are flow-charts showing the operational procedure of the processor of FIG. 1.

FIG. 5 is a flow-chart of the operational procedure of the image input processor according to the first embodiment. While the image input switch 10f is in ON state (step S1), the image information is read (S2). Then, when the image input switch 10f is turned off (S3), the read image information is printed out (S4).

Figure 6:
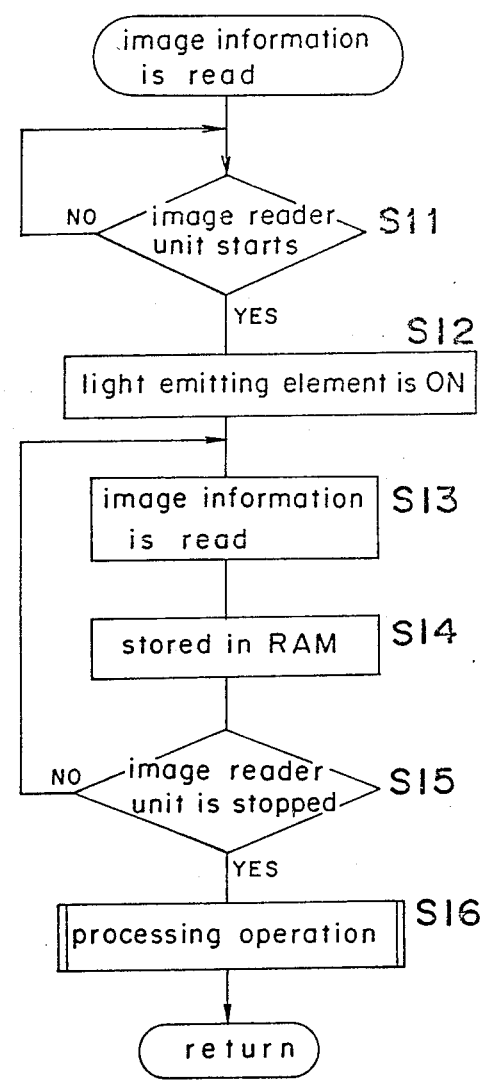

FIG. 6 is a flow-chart showing the reading procedure of the image information in the main routine of FIG. 5. As soon as the image reader unit 2 begins to run on the original 4 (S11), the light emitting element 11 generates light (S12), and the light receiving element 12 detects bright and shade of the emitted light which is reflected by the original 4, so that the image information is read (S13). The read image information is stored in the RAM 6 as dot image data (S14). While the image reader unit 2 is running on the original, the light receiving element 12 information reading the image information is repeated and the read image information is stored in the RAM 6. When the image reader unit 2 is stopped (S15), processing of the image information which will be later described is carried out (S16). Then, the flow is returned to the main routine.

Figure 7:
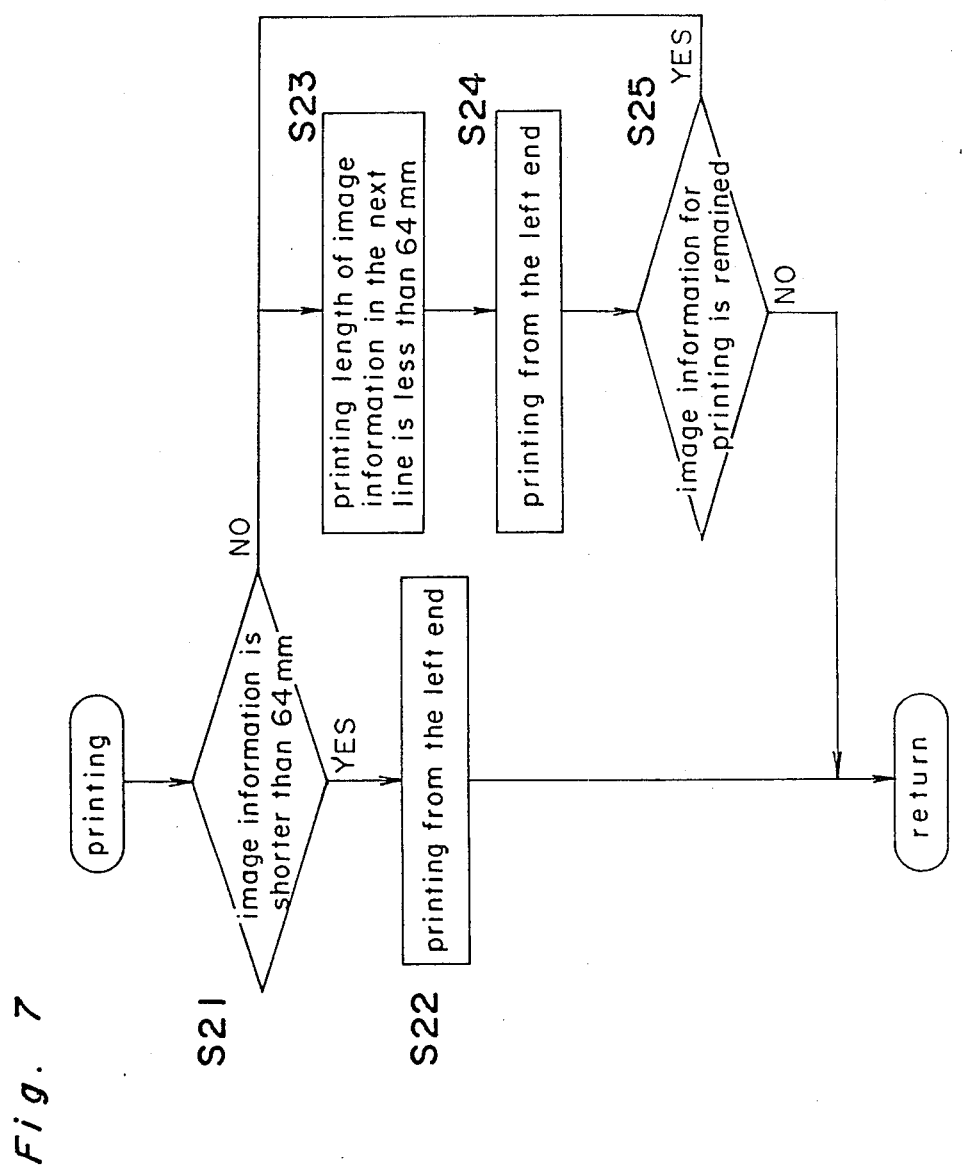

FIG. 7 is a flow-chart showing the procedure of the printing operation in the main routine. It is detected whether the image information to be printed is shorter than 64 mm (S21). In the case where the image information to be printed is shorter than 64 mm, the image information is printed as it is read from the left end of the printing width of a line (S22). Then, the flow is returned to the main routine. On the contrary, when the length of the image information to be printed is more than 64 mm, the image information should be printed in plural lines. For this purpose, the first 64 mm of the read image information is determined (S23). The first 64 mm of image information is printed from the left end of the printing width of a line (S24). Then, it is detected whether any image information remains to be printed (S25). If there is the image information left to be printed, the image information for the second line is determined for a length of information less than 64 mm, which will be printed from the left end of the printing width of the second line. Thereafter, it is detected again whether any image information remains to be printed. When image information remains to be printed, the above-described procedure is repeated. When no image information remains to be printed, the flow is returned to the main routine.

Figure 8:
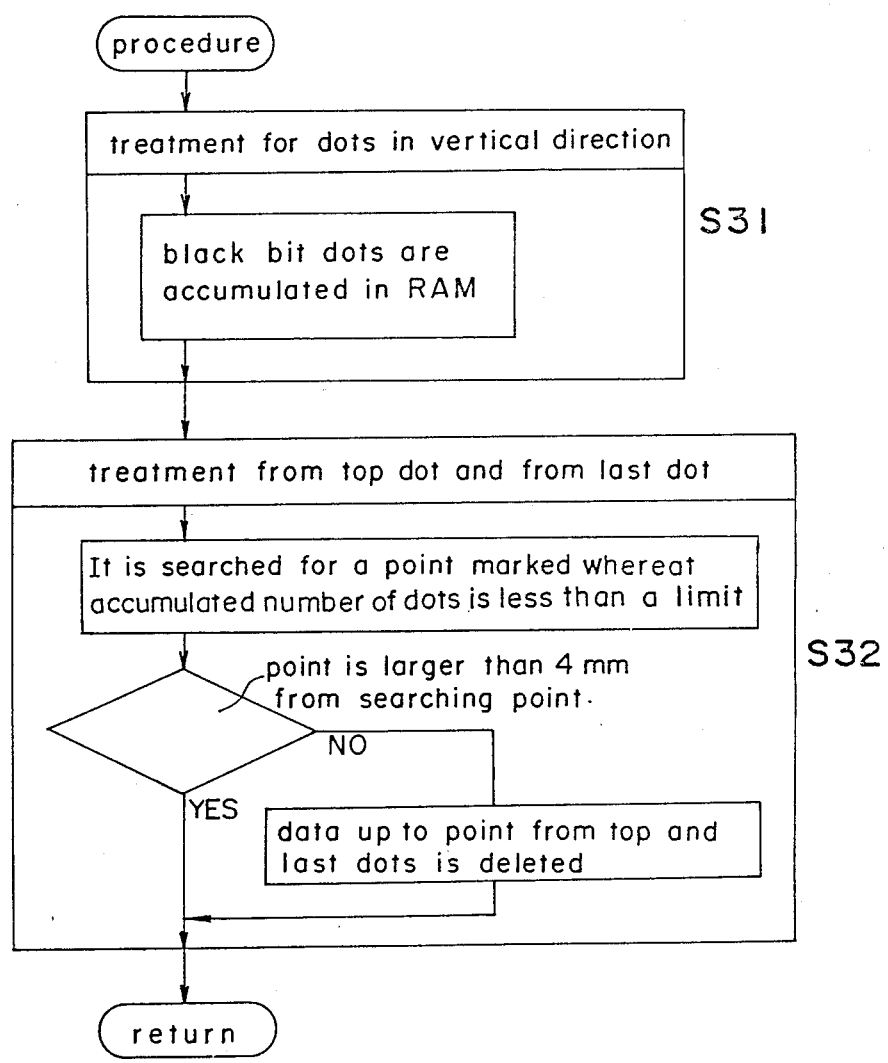
Figures 9A, 9B:
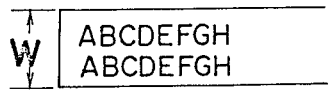
FIGS. 9–11 are views showing the pattern of oringnal character information and character information of the printed output according to a conventional input processor.
Figures 10A, 10B:
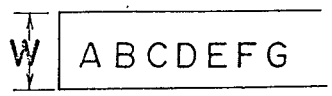
Figures 11A, 11B:
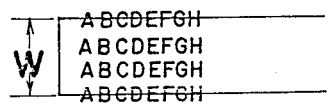
Figure 12:
FIGS. 12 and 13 are views showing the pattern of oringnal character information.
Figure 13:
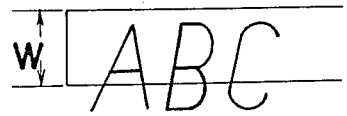

FIG. 8 is a flow-chart showing the procedure of the processing operation in the image reading routine. Black bits of the dot image data stored in the RAM 6 in a transverse direction are accumulated for every bit or a part of the bits in a vertical direction (S31). Thereafter, one dot after another is searched downwards from the upper end of the read image information for a point where the accumulated bits become less than a limit. If the distance to the point from the upper end of the image information is shorter than half the readable width W, namely, the point is found above the center of the readable width W, the image information up to this point is erased or masked in printing. On the other hand, if the distance to the point is over the readable width W, the image information up to this point is outputted. Next, a point from the lower end of the image information is searched upwards in the same manner as above (S32). Accumulation of black bits and a decision of the rate of the accumulated bits with respect to the readable width W are conducted in the CPU 9. For example, in the case of FIG. 3, since the distance to the point searched from the upper end of the image information is smaller than the limit, the flow is returned immediately to the main routine. On the contrary, if the point is searched from the lower end of the image information, there is a blank over the characters "ABC", but the distance to the point from the lower end is more than half the readable width W, whereby the image information is printed as it is read.

In the accumulation of black bits, the reason for deciding the accumulation result on the basis of whether it is larger or smaller than the limit is to avoid effects of dust, etc. to the dot image.

As is described above, according to the first embodiment of the present invention, it is so arranged that necessary information and unnecessary information can be distinguished from each other based on the degree of how much read image information is cut off. Therefore, necessary information is printed as it is read, and unnecessary information is not printed although it is read, which results in an enhancement of operational efficiency in the image reading.

SECOND EMBODIMENT

The structure and the operation of an image input processor according to a second embodiment of the present invention are the same as those of the first embodiment shown in the block diagram of FIG. 1, and therefore the description thereof will be abbreviated here.

Referring to FIG. 14, the operational procedure of the image input processor according to the second embodiment will be explained. It is to be noted that the graphic switch 10c is required to be switched to the word mode in order to carry out the following operation.

When the image input switch 10f is in an ON state (step M1), the first line of the information is read (M2). Then, if the image input switch 10f is turned into an OFF state (M3), various kinds of other operations are conducted (M9), so that the processed image information is printed out (M10).

Figures 16, 17, 18, 19:
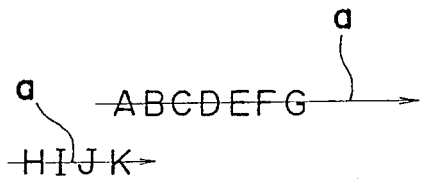
FIGS. 16 and 17 are views of oringnal character information.
FIG. 19 is a view showing the pattern of the printed output in a conventional processor.
Figure 20:
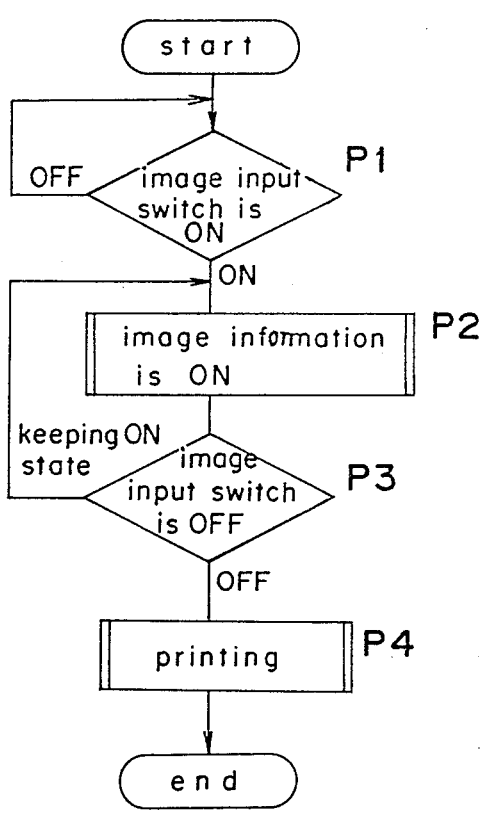
FIGS. 20–23 are flow-charts showing the operational procedure of an image input processor according to a third embodiment of the present invention.

Meanwhile, when the image input switch 10f is still in the ON state after reading the first line of the image information (M3), the image reader unit 2 stops moving, which results in an interruption of the rotation of the disc 14. At this time, in consequence of the disappearance of a signal from the photo-interrupter 13, the address in which the last image information stored in the RAM 6 is memorized (M4). Then, in the case where the image information on the second line and thereafter is read, if the image input switch 10f remains in the ON state, the image information is repeatedly read (M5) and at the same time, the last address of the image information stored by the RAM 6 is repeatedly memorized (M4). Thereafter, if the image input switch 10f is turned into the OFF state (M6), the information on the blank from the last address to the succeeding image information is fully erased (M7, M8). After all of the last addresses are subjected to the above-described operation, various kinds of other operations are conducted (M9) and the read image information is printed (M10). The above operation including erasure of the information on the blank is controlled by the CPU 9. As a result, unnecessary blanks are removed, so that a desired sequence of printed output is obtained, as shown in FIG. 18.

FIG. 15 is a flow-chart showing the procedure of the reading operation of the image information in the main routine of FIG. 14. When the image reader unit 2 starts to run on the original 4 (M11), the light emitting element 11 generates light (M12), and the light receiving element 12 detects the brightness and the shade of the light reflected by the original 4, so that the image information is read (M13). The read information is stored in the RAM 6 as dot image data (M14). While the image reader unit 2 is running, the light receiving element 12 repeats reading of the image information, and the read image information is repeatedly stored in the RAM 6. When the movement of the image reader unit 2 is stopped (M15), various kinds of other operations are carried out (M16). Thereafter, the flow is returned to the main routine.

According to the second embodiment of the present invention as described above, even if the reader unit overruns when reading the first line, and then reads the second line, the character information on the first and second lines is arranged to be printed out in succession, with the blanks bridging the first and second lines being removed. Therefore, the image information can be printed in a desired manner without unnecessary blanks.

THIRD EMBODIMENT

The structure and the operation of an image input processor according to a third embodiment of the present invention are the same as in the first embodiment shown in FIG. 1, the description of which will therefore be abbreviated here.

Referring to a flow-chart of the operational procedure of the image input processor of the present embodiment, when the image input switch 10f is in the ON state (step P1), the image information is read (P2). When the image input switch 10f is turned off (P3), the read image information is printed.

Figure 21:
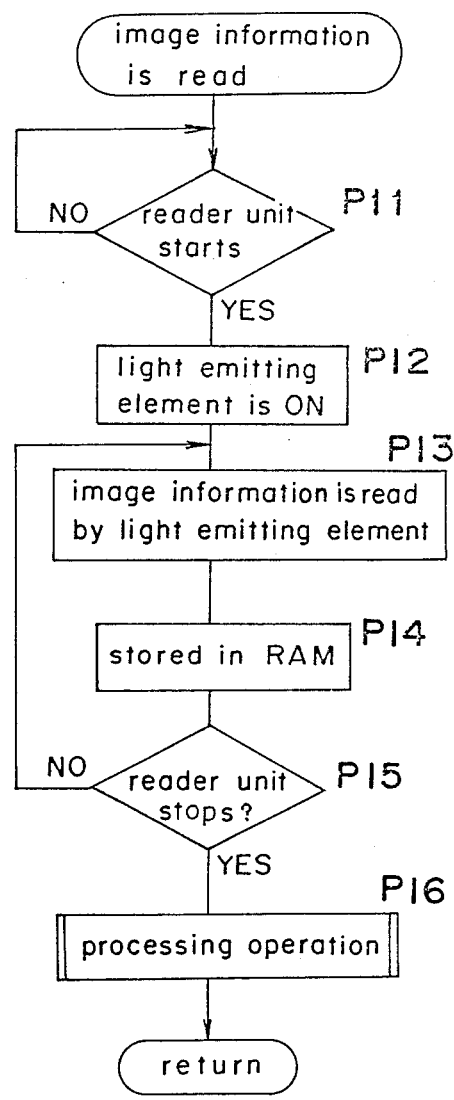

In FIG. 21, the procedure for the reading operation of the image information in the main routine is illustrated. When the reader unit 2 starts to run on the original 4 (P11), the light emitting element 11 emits light (P12). At the same time, the light receiving element 12 detects the brightness and shade of the emitted light which is reflected by the original 4, in order to read the image information (P13). The read image information is stored in RAM 6 (P14). During running of the image reader unit 2, reading of the image information by the light receiving element 12 is repeated, and storage of the read image information in the RAM 6 is repeatedly carried out. When the reader unit 2 stops running (P15), the processing operation is carried out (P16), and the flow returns to the main routine.

Figure 22:
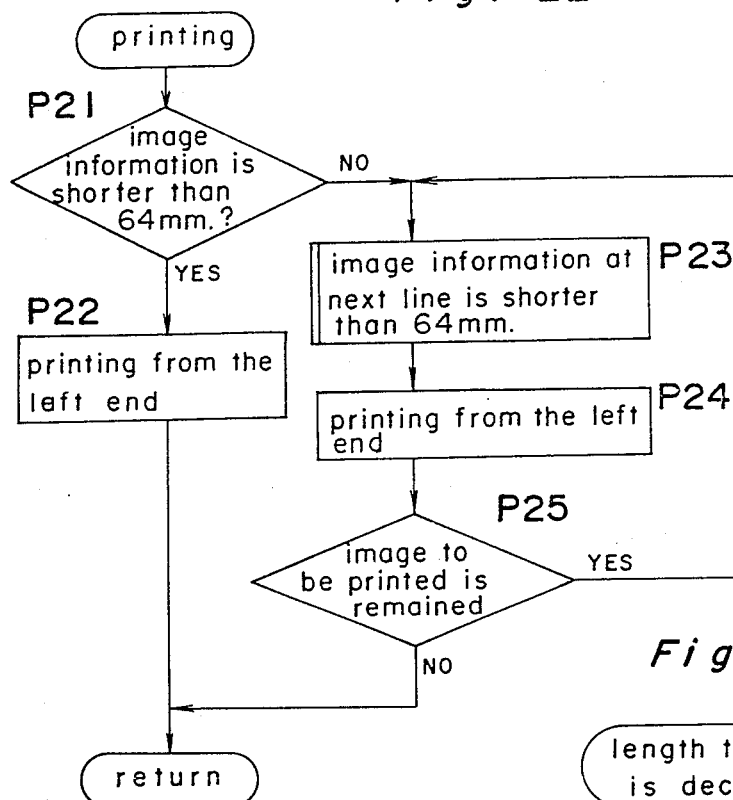

FIG. 22 is a flow-chart showing the procedure of the printing operation in the main routine. It is detected first whether the length of the image information to be printed is shorter than the printing width, namely, 64 mm (P21). If the length is shorter than 64 mm, the read image information is printed as it is from the left end of the printing width of a line (P22), with the flow returning to the main routine. If the length of the image information to be printed is more than 64 mm, the image information should be printed in plural lines. For this purpose, the first 64 mm of the read image information is decided (P23), which is printed from the left end of the printing width of a line (P24). Then, it is detected (P25) whether or not any image information remains to be printed. If image information remains to be printed, the image information to be printed on the second line is decided from the image information for a length less than 64 mm, and is printed from the left end of the printing width of the second line. Thereafter, the presence or the absence of the image information remaining to be printed is detected. If there is a remainder of image information, the above-described procedure is repeated. On the other hand, if no image information remains to be printed, the flow returns to the main routine. The detection of the length of the image information, namely, whether the image information to be printed is longer or shorter than 64 mm, is carried out in the CPU 9.

Figure 23:
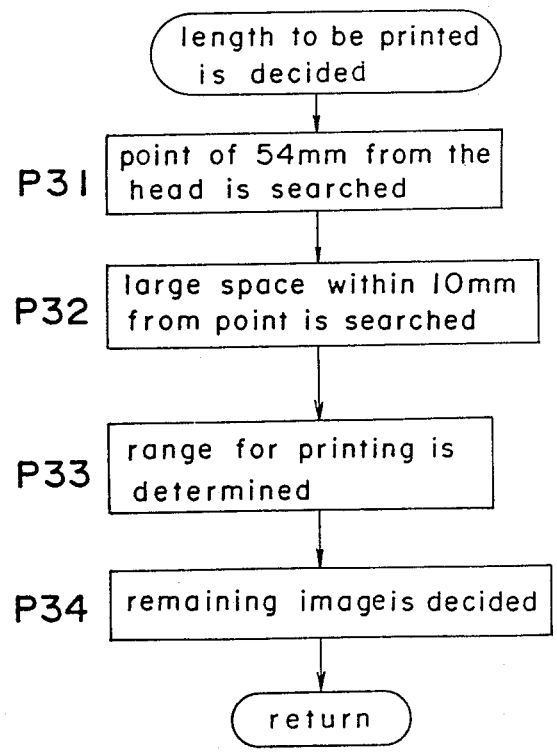
Figure 24:
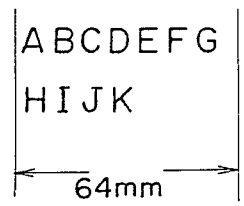
FIG. 24 is a view showing the pattern of the printed output by the processor according to the third embodiment of the present invention.
Figure 25:
FIG. 25 is a view showing the image pattern of an original.
Figure 26:
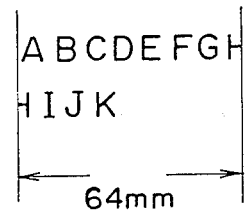
FIG. 26 is a view showing the pattern of the printed output in a conventional art.

FIG. 23 is a flow-chart showing the operational procedure in the sub-routine of step P23 for deciding whether the length of the image information is less than 64 mm. A point is searched which is 54 mm from the head of the image information to be printed next to the image information in the RAM 6 (P31). Furthermore, the largest space in the range between the point being searched which is 54 mm from the head of the image information to be printed next, and 64 mm, (that is, in the range 10 mm from the right end of the printing width is searched (P23)). The range after the end of the space is decided to be the remaining image information (P34). The search for the largest space as described above is carried out by control of CPU 9. The printer unit 7 prints out from the head of the image information to the head of the space. As a result, when the image information shown in FIG. 25 which has a longer length than the printing width is read, the image information is printed in two lines for a natural output, as shown in FIG. 24 in which the image information is divided at the point between characters.

Thus, as is described hereinabove, in the image input processor according to the third embodiment of the present invention, in the case where the read image information is longer than the printing width, a line is arranged to be changed at the largest space of the character information within a fixed range from the right end of the printing width. Therefore, the character information which is longer than the printing width can be correctly divided at the point between characters, thereby providing a natural and easy-to-see printed output.

FOURTH EMBODIMENT

Since the structure and operation of an image input processor according to a fourth embodiment of the present invention are the same as in the processor of the first embodiment shown in FIG. 1, the description thereof will be abbreviated here for brevity.

An explanation will be given of the procedure for drawing up a wordbook with the employment of the image input processor of the present embodiment.

When a translated term is longer than the maximum printing width and is printed in a manner which ends at the right end of the printing width, the term is printed in two lines. In this case, if the translated term is printed simply in a manner which ends at the right end of the printing width, a part of the translated term is printed over the entire line, namely, from the left end to the right end of the printing width of the line. The remaining part of the term is printed to end at the right end of the printing width, and keeps blanks at the left side of the printing width. Therefore, the printed output appears unnatural and hard to see. According to the present embodiment, however, a ready-to-see workbook can be prepared.

FIG. 27 shows image information for an original to be used in the preparation of a wordbook. As shown in FIG. 28, in reading the image information, the reader unit 2 is moved on each of the image information in a direction shown by an arrow R. In FIG. 28, references al, a3 and a5 represent English words, while references a2, a4 and a6 represent corresponding translated terms. It is to be noted that the frame indicated by solid line in FIG. 28 is the area for reading the image.

When a wordbook is prepared by reading out the character information from the original, the layout switch 10g should be turned on. The image reader unit 2 is put on the first character in the word a1 for reading the word a1, and is moved in the direction shown by the arrow R while the image input switch 10f is depressed. When the reader unit 2 comes on the last character in the word a1, the image input switch 10f is stopped from being depressed. At this time, the image of the word a1 is completely inputted. Then, in order to read the translated term a2, the image reader unit 2 is further moved to reach the first character of the translated term a2, while the image input switch 10f is depressed, the image reader unit 2 is moved in the R direction. When the image reader unit 2 is placed on the last character of the term a2, the unit is stopped and the image input switch 10f is depressed. Thus, the image of the term a2 is completely inputted. In the same manner as above, the word a3 and the translated term a4 are respectively read out at the third time and at the fourth time. Since each word of the words a5 and the corresponding translated term a6 is no longer than a given length, they are written in different lines in the original. Accordingly, after the word a6 is read at the fifth time, the image reader unit 2 is moved downwards to a lower line for reading the term a6 at the sixth time.

FIG. 29 shows the pattern of a wordbook which is prepared by printing the image information read out of the original in the manner as above. A1, A3 and A5 are printed patterns of the words a1, a3 and a5 from the original. A2, A4 and A6 are printed patterns of the terms a2, a4 and a6 from the original. The patterns A1, A3 and A5 of the respective words a1, a3 and a5 read out at an odd number's time are left-justified or right-justified, while the patterns A2, A4 and A6 of the respective terms a2, a4 and a6 read out at an even number's time are right-justified or left-justified. The translated terms A2, A4 and A6 are printed respectively on a different line with respect to the corresponding words A1, A3 and A5.

Figure 30:
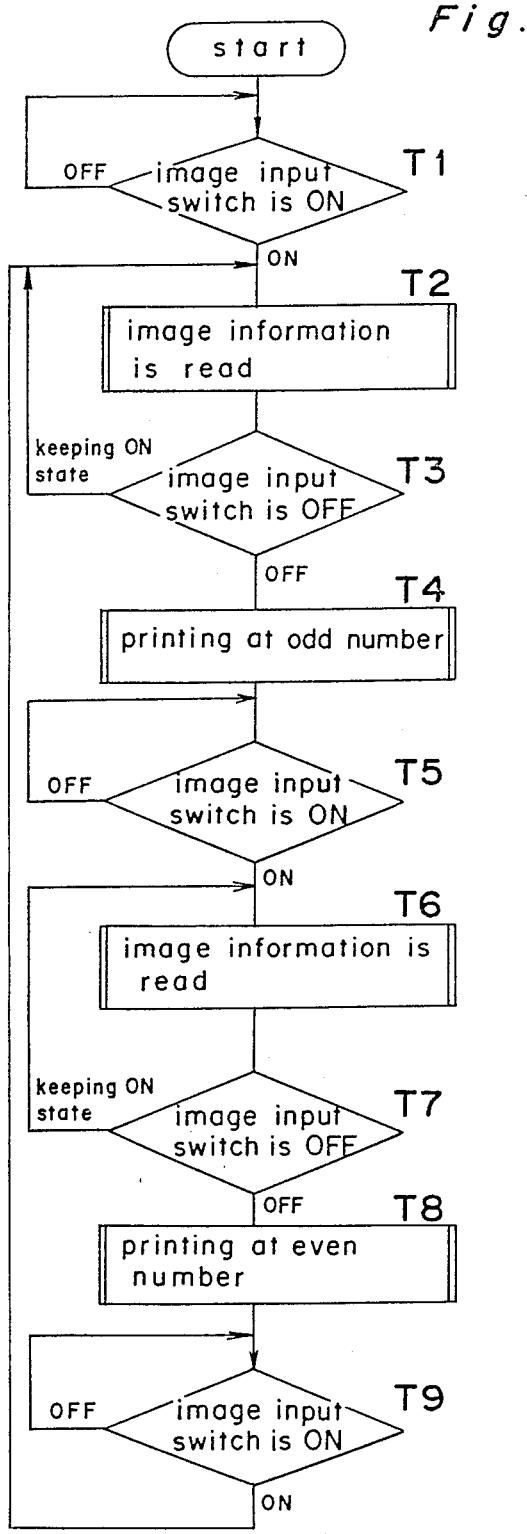
FIGS. 30–33 are flow-charts showing the operational procedure of the processor according to the fourth embodiment of the present invention.

FIG. 30 is a flow-chart of the operational procedure for preparation of the wordbook.

When the image input switch 10f is turned ON (step T1), reading of the image information at an odd number's time is conducted (T2). When the input switch 10f is turned OFF (T3), printing of the read image information at the odd number's time is carried out (T4). When printing is completed (T5), reading of the image information at an even number's time is carried out (T6) if the image input switch 10f is turned ON. Then, when the image input switch 10f is brought into the OFF state (T7), printing of the image information at the even number's time is conducted (T8). Thereafter, when the image input switch 10f is turned ON, the flow returns to step T2, and the aforementioned procedure is repeated. The CPU 9 decides the time for reading and printing of the image information, namely, at which time the reading and the printing of the image information is carried out.

Figure 31:
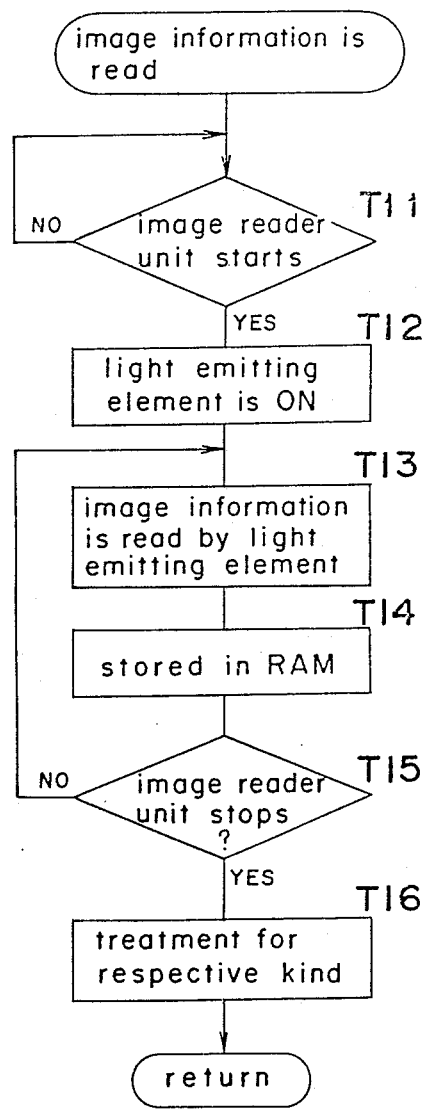

The procedure for the reading operation of the image information in the main routine is indicated in a flow-chart of FIG. 31. When the image reader unit 2 starts to run on the original 4 (T11), the light emitting element 11 generates light (T12), and the light receiving element 12 detects the brightness and shade of the light reflected by the original 4, so that the image information is read (T13). The read image information is stored in the RAM 6 (T14). During running of the image reader unit 2, the light receiving element 12 repeats reading of the image information, with the read image information being repeatedly stored in the RAM 6. Upon stopping of the image reader unit (T15), various kinds of other operations are carried out (T16). Then, the flow is returned to the main routine.

Figure 32:
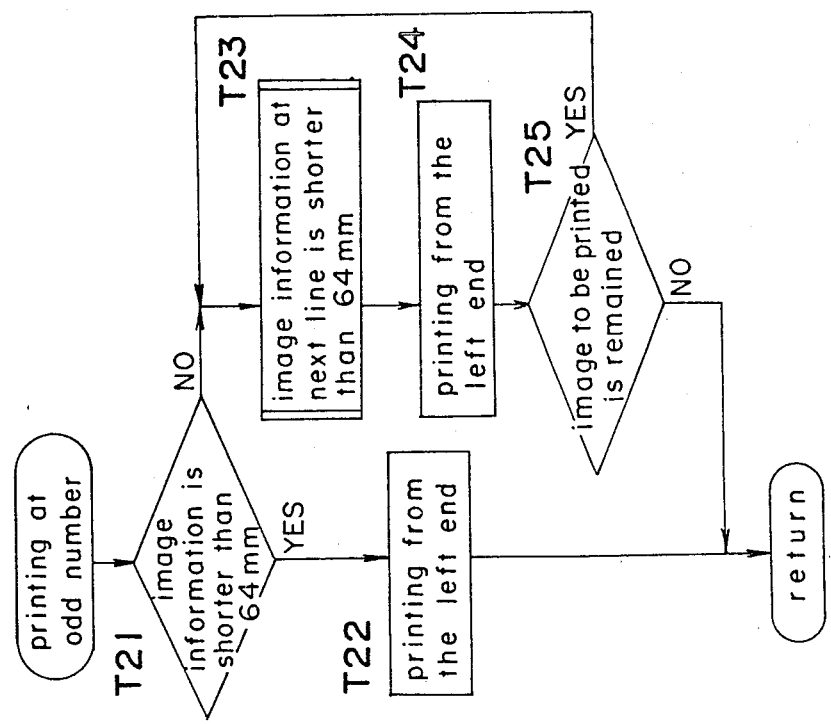

In FIG. 32, the procedure for the printing operation at an odd number's time in the main routine is shown. First, it is detected whether the image information to be printed is shorter than 64 mm (T21). If the image information to be printed is shorter than 64 mm, it is printed as it is read from the left end of the printing width (T22) and the flow returns to the main routine. This is the case where English words a1 and a3 having a length shorter than 64 mm among the words in FIG. 28 are printed. The English words a1 and a3 are thus printed from the left end of the printing width as indicated in FIG. 29 by the printed patterns A1 and A3. When the length of the image information to be printed is longer than 64 mm, the image information to be printed should be printed in plural lines. Therefore, it is necessary first to decide the first 64 mm of the read image information (T23). The first 64 mm of the read image information is printed from the left end of the printing width (T24). In step T25, it is detected whether there is remaining any image information to be printed. When there is remaining information, the image information to be printed on the second line is decided for a length shorter than 64 mm, which is then printed from the left end of the printing width. Again, it is detected whether image information remains to be printed. If image information remains to be printed, the flow returns to the main routine. The above case where the English word a5 is longer than 64 mm as shown in FIG. 28 is printed. As seen from the printed pattern A5 of FIG. 29, the first 64 mm of the image information is printed on a first line, and the remaining image information is printed from the left end of the printing width on a second line. Whether the image information to be printed is longer than 64 mm is detected by the CPU 9. The CPU 9 also divides the image information into image information in of a shorter length than 64 mm.

Figure 33:
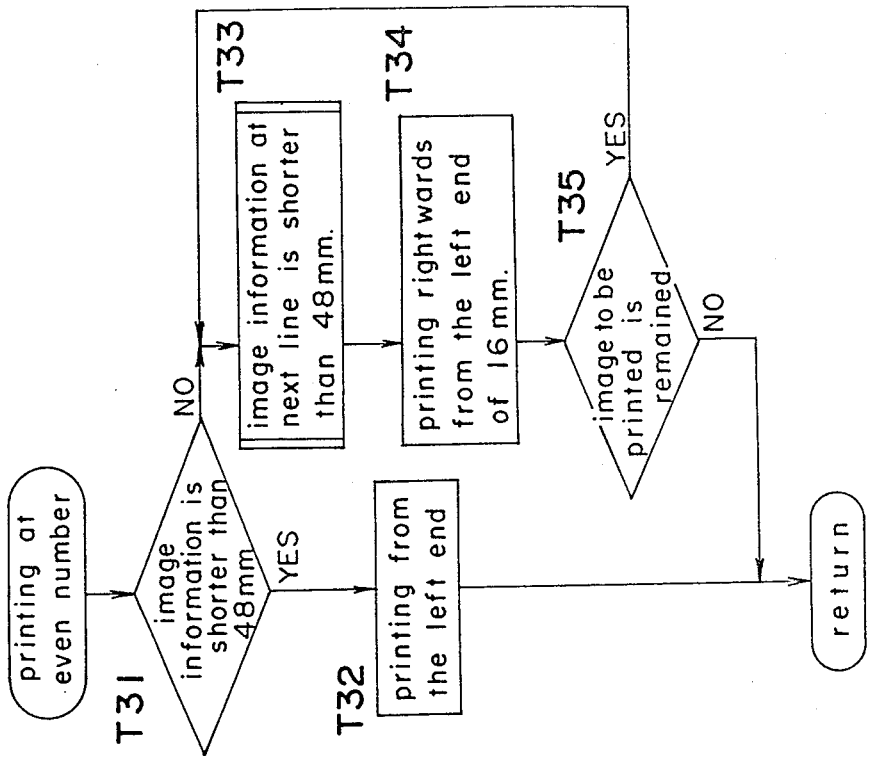

FIG. 33 is a flow-chart showing the procedure in the printing operation at an even number's time in the main routine. It is detected in step T31 whether the image information to be printed is shorter than 48 mm. When the length is shorter than 48 mm, the read image information is printed as it is to draw near to the right end of the printing width (T32). Then, the flow returns back to the main routine. This is the case where the translated term a2 of FIG. 28 is printed. As shown in FIG. 29 by the printed pattern A2, the translated term is printed in a manner bringing the end of the term to the right end of the printing width. On the other hand, when the image information having a length over 48 mm is printed, the image information should be printed in plural lines. For this purpose, the first 48 mm of the read image information is decided (T33). The 48 mm image information is printed, with its head position 16 mm from the right of the left end of the printing range (T34). Thereafter, it is detected whether there is any image information yet to be printed (T35). If there is image information remaining to be printed, the image information to be printed on the second line is decided for a length less than 48 mm. The decided image information having a length shorter than 48 mm is printed on the second line, with its head positioned 16 mm away from the left end of the printing width. Then, if it is detected that there is image information yet to be printed, the above-described procedure is repeated. This is the case for printing the translated terms a4 and a6 which are longer than 48 mm as shown in FIG. 28. The terms a4 and a6 are printed, as represented by printed patterns A4 and A6 in FIG. 29, in two lines with their heads positioned 16 mm away from the left end of the printing width. In the CPU 9, it is detected whether the image information to be printed is longer than 48 mm, and the image information is divided to be shorter than 48 mm.

In the manner, as described above, in the case where the image information is to be printed in a manner drawn near to the right end of the printing width and is longer than 48 mm, the image information is divided to be shorter than 48 mm. Then, the divided image information is printed, with its head positioned 16 mm away from the left end of the printing range. Accordingly, an easy-to-see wordbook with a natural appearance can be formed by the processor of the present invention.

Although it is so arranged in the foregoing embodiment that the image information read at an odd number's time is printed, with its head positioned at the left end of the printing width, and the image information read at an even number's time is printed, with its end drawn near to the right end of the printing width. It may be possible, depending on use, that the image information read at an odd number's time is printed, with its end drawing near to the right end of the printing width, while the image information read at an even number's time is printed, starting from the left end of the printing width.

As is described above, according to the fourth embodiment of the present invention, the image information read at an odd number's time or at an even number's time is printed, starting from the left end of the printing width, and the image information read at an even number's time or at the odd number's time is printed, with its end drawing near to the right end of the printing width, such that a good-looking and easy-to-see printed pattern can be obtained. Therefore, the image input processor according to the fourth embodiment of the present invention is effective in making a wordbook or the like.

FIFTH EMBODIMENT

A schematic explanation will be made of an image input processor according to a fifth embodiment of the present invention.

Figure 35:
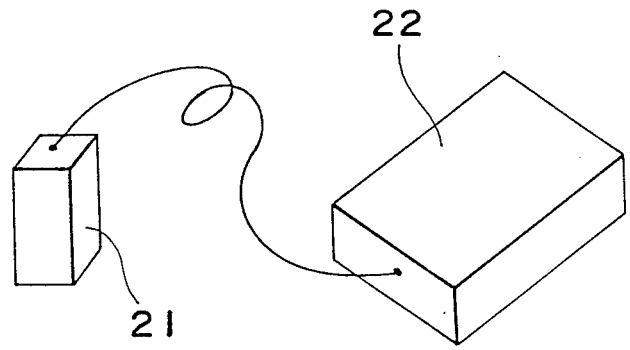
FIG. 35 is a perspective view of the total structure of the processor of FIG. 34.

The image input processor of FIG. 35 is comprised of an image sensor unit 21 which is a data input member and a printer unit 22 for printing out data read by the image sensor unit 21. The image sensor unit 21 is manually moved on the surface of data to be inputted. Within the image sensor unit 21 a data reader member 24 which optically reads the data described on the data surface, and a movement amount detection member 23 which outputs detection pulses corresponding to the movement of the image sensor unit 21 on the data surface are included.

Figure 36:
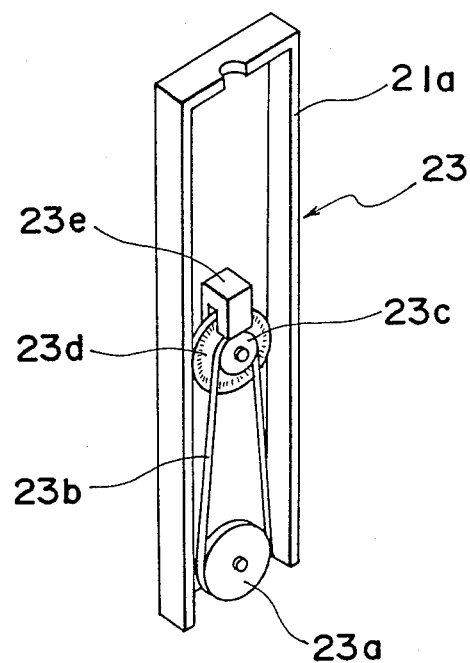
FIG. 36 is a perspective view of a detection part of the processor according to the fifth embodiment of the present invention.

As illustrated in FIG. 36, in the detection member 23 referred to above, a detection pulley 23a is installed in the lower end part of a main casing 21a in a manner to slight expose downwards from the main casing 21a. In accordance with the movement of the sensor unit 21, the detection pulley 23a is rotated on the data surface. The rotation of the detection pulley 23a is transmitted to a transmission pulley 23c by way of a belt 23b. The transmission pulley 23c has a rotation detection disc 23d coaxially fixed thereto so as to be rotated unitedly. The disc 23d has many slits formed in the peripheral surface thereof in a radial direction and spaced equally from each other. Moreover, the rotation detection disc 23d is oppositely provided with a photo-interrupter 23e which outputs a detection signal when detecting a slit. Each pitch of the slits is made small so as to enhance the analyzing precision.

Figure 34:
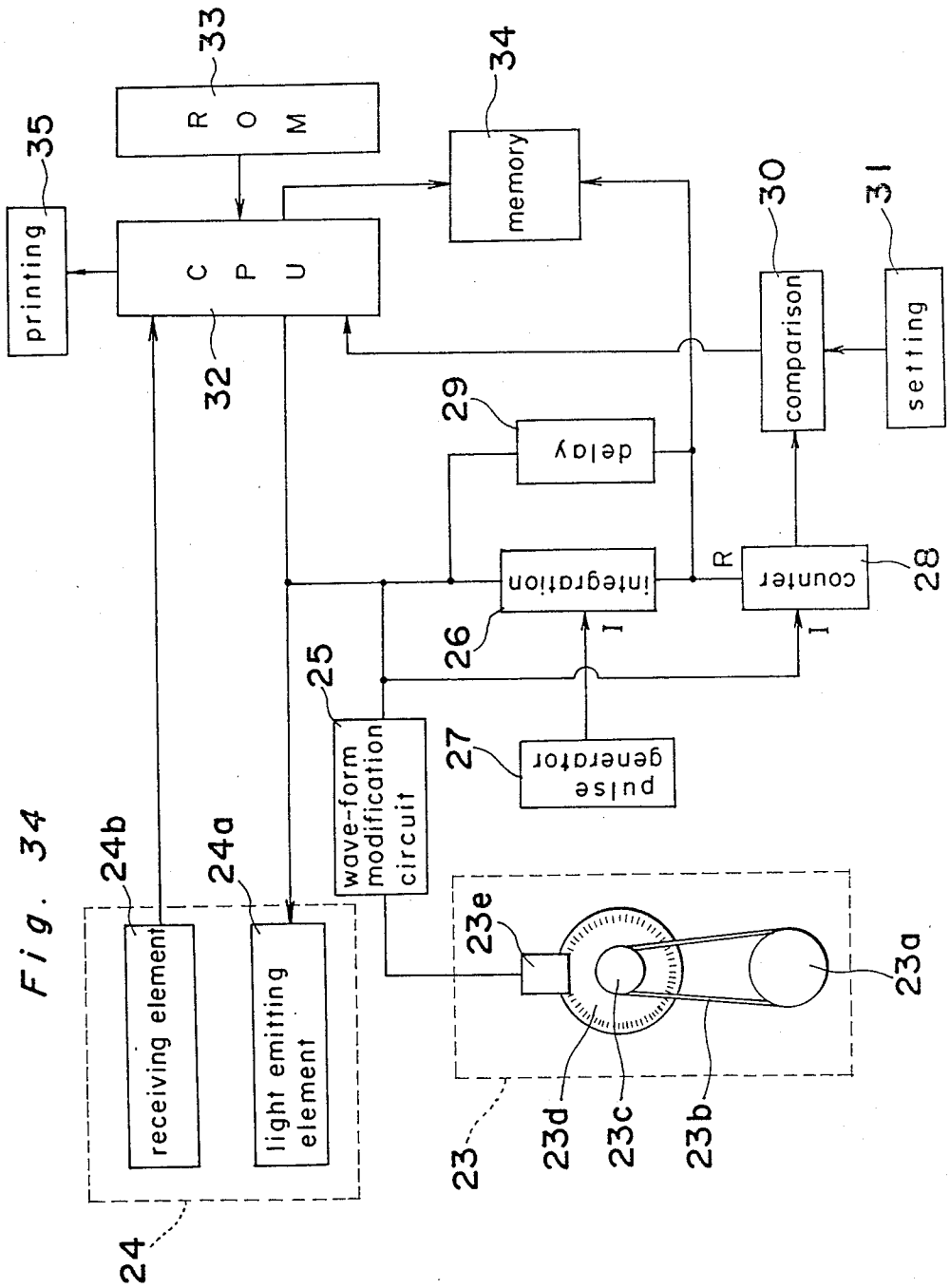
FIG. 34 is a block diagram showing the structure of an image input processor according to a fifth embodiment of the present invention.

The movement amount detection member 23 in FIG. 34 is the same as described in FIG. 36. The data reader member 24 accommodated within the image sensor unit 21 together with the movement detection member 23 is comprised of a light emitting element 24a which emits light, for example, on the character or drawing, etc. described on the paper in a synchronous relation to the detection pulse generated by the detection member 23, and a light receiving element 24b which receives reflected light corresponding to the data in response to the light from the light emitting element 24a, thereby reading the data.

The detection signal outputted from the movement amount detection member 23 is modified into a pulse signal by a waveform modification circuit 25. The detection pulse signal is then inputted to a reset terminal R of an integration circuit 26. The integration circuit 26 receives a clock pulse of a constant pitch outputted from a pulse generator 27 through an input terminal I for integrating the same. At the same time, when the value of the integration is over a predetermined value, the integration circuit 26 outputs a reset signal to a reset terminal R of a counter 28. Further, the reset signal from the integration circuit 26 is, after the lapse of a predetermined delay time in a delay circuit 29, inputted again to a reset terminal R of the integration circuit 26. The counter 28 is provided to take the detection pulse generated by the waveform modification circuit 25 from an input terminal I for counting the same. The counted signal is outputted to a write control unit 30 that is constituted by a comparison circuit.

In the write control unit 30, the counted signal from the counter 28 is compared with a set signal for moving an amount which is stored in a seting device 31. Moreover, when the counted signal becomes larger than the set signal, the write control unit 30 generates an instruction signal to CPU 32 in which various signals are processed in accordance with the program stored in Rom ROM 33. Specifically, the CPU 32 drives the light emitting element 24a for emitting light in synchronous relation with the detection pulse signal outputted from the waveform modification circuit 25. At the same time, the CPU 32 takes in the data reading signal generated from the light receiving element 24b in response to the write instruction signal from the write control unit 30 so as to temporarily store the data reading signal in the ROM 34. Furthermore, the CPU 32 drives a printing member of the printer unit 22 to print out the read data.

The operation of the above-described image input processor will be described hereinbelow. When the image sensor unit 21 is placed on the data surface at the start point of reading, the detection pulley 23a of the detection member 23 is rotated corresponding to the movement of the image sensor unit 21 if the image sensor unit 21 moves even slightly. Consequently, a detection signal is generated from the photo-interrupter 23e by the slits of the rotation detection disc 23d which is rotated simultaneously with the detection pulley 23a. The detection signal is in turn converted into a pulse signal by the waveform modification circuit 25. Every time the detection pulse signal is generated, the integration circuit 26 is reset.

Because the image sensor unit is not rolled on the data surface at this time, the detection pulse signal is not generated continuously, and intermittent outputs result. Therefore, during the time until the integration circuit 26 is reset again since it is reset by the detection pulse signal, the value of integration by the integration circuit 26 which integrates the clock pulses from the pulse generator 27 becomes a fixed value. Accordingly both the counter 28 and the memory 34 are reset by the reset signal outputted from the integration circuit 26. At the same time, the integration circuit 26 itself is reset after the delay time. Therefore, the count value of the counter 28 for counting the detection pulse signal never exceeds the set value set by the setting device 31 and the write instruction signal is not generated from the write control unit 30. The data read from the light receiving element 24b of the data reader member 24 is obstructed by the CPU 32, and is not to be stored in the ROM 34. In other words, so long as the integration circuit 26 is not reset by the detection pulse signal during the time period since the integration circuit 26 is reset by the detection pulse signal until the value of integration reaches a predetermined value, the integration circuit 26 generates a reset signal intermittently. Every time the reset signal is outputted from the integration circuit 26, the counter 28 is reset. That is, so long as the image sensor unit 23 is moved with a predetermined speed, and is not moved over a fixed distance, the read data is prohibited from being stored in the memory 34.

As soon as the image sensor 21 starts to be manually rolled on the data surface, a detection signal is continuously generated from the detection member 23 in accordance with the movement of the image sensor 21. When the time interval for generation of detection pulse signals becomes shorter than the time period during which the value of integration by the integration circuit 26 reaches a predetermined value, the integration circuit 26 does not to generate a reset signal. From this fact, it is detected that the moving speed of the image sensor 21 becomes faster than a predetermined level.

Without the reset signal generated from the integration circuit 26, since the counter 28 is not reset and the detection pulse signal is counted consecutively one after another. Subsequently, when the count value of the counter 28 becomes more than the set value, a write instruction signal is outputted from the write control unit 30, so that the data read from the light receiving element 24b is processed by the CPU 32 to be stored temporarily in the memory 34. In the above-described arrangement, the read data is prohibited from being stored in the memory 34 under the conditions where the image sensor 21 is moving from the start to a fixed distance and the image sensor 21 is not angularly held stable onto the data surface.

Figure 37:
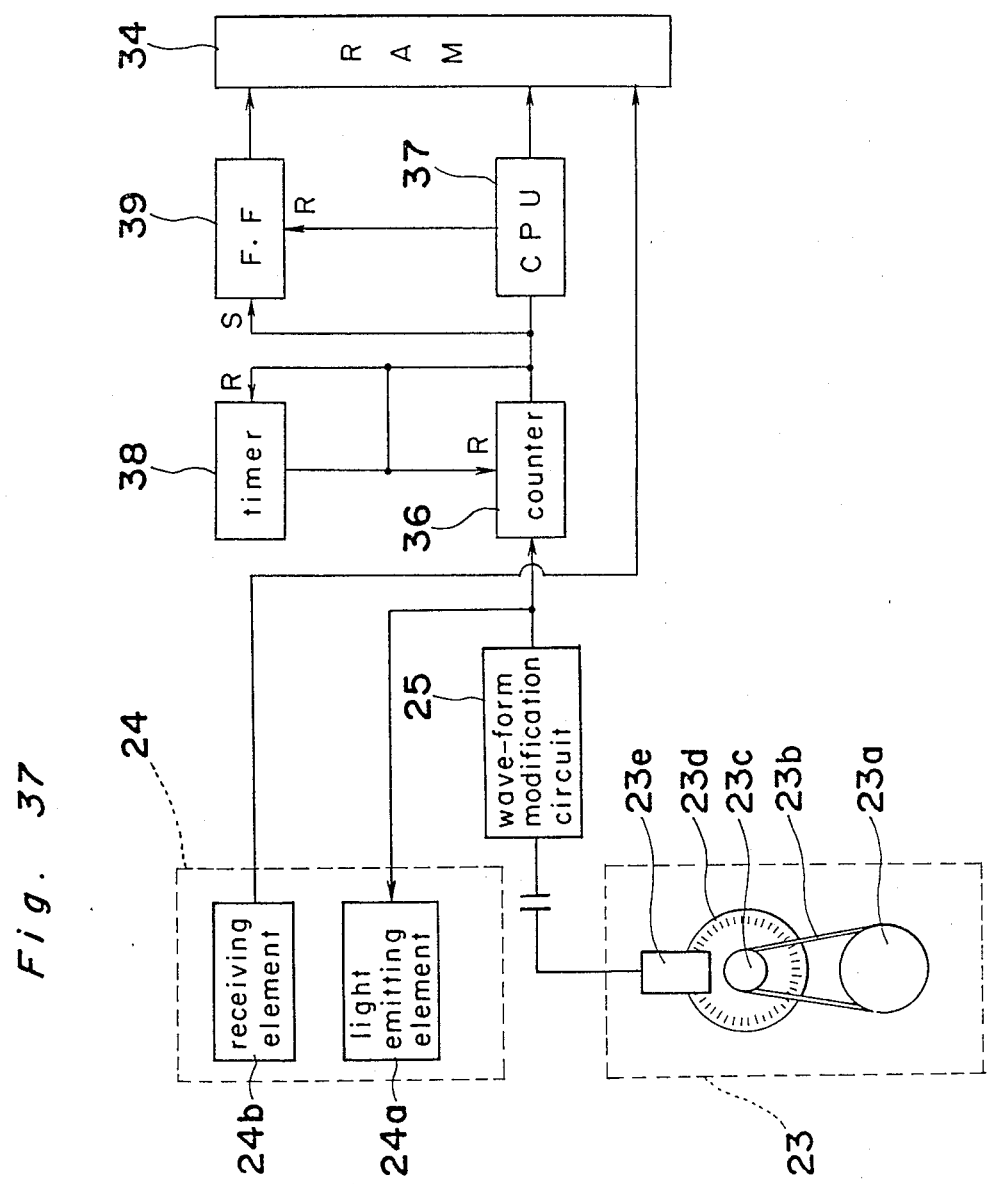
FIG. 37 is a block diagram showing the structure of a modification of FIG. 34.

FIG. 37 is a modification of the image input processor of FIG. 34, in which same parts or like parts are designated by the same or like reference numerals. The processor is to be arranged so that the counter 36 for counting a detection pulse signal generated from the waveform modification circuit 25 generates a signal, when having counted a fixed number, for example, "2", to the CPU. The reset terminal R of a timer circuit 38 and a set terminal S of the write control unit 39 are comprised of flip-flops. The write control unit 38 is placed in the reset state by the reset signal which is inputted from the CPU 37 to the reset terminal R thereof when the counter 36 does not generate a signal. When the write control unit 39 is brought into the set state by a signal inputted to the set terminal S thereof, the write control unit 39 generates a write instruction signal to the memory 34. The timer circuit 38 is reset when the output signal from the counter 36 is inputted to the reset terminal R thereof. Moreover, the timer circuit 38, after timing a predetermined time, generates a reset signal to the reset terminal R of the counter 36. At the same time, the timer circuit 38 is inputted to a reset signal to the reset terminal R thereof, and returns to the reset state.

As is described above, in the state immediately before the image sensor unit 21 starts to be manually driven, the detection pulse signal is outputted intermittently from the detection member 23. Accordingly, before the counter 36 for counting the number of the detection pulse signals counts "2", the counter 36 is reset by the reset signal outputted from the timer circuit 38 as a result of the time lapse of the timer counter 38. Moreover, a signal is not generated from the counter 36 since the count value of the counter 36 does not reach "2", and the write control unit 39 is held in the reset state. Therefore, the read data from the light receiving element 24b is not stored in the memory 34.

Since the detection member 23 continuosly outputs detection pulse signals when the image sensor unit 21 starts to be manually driven, the count number of the counter 36 becomes "2" before the timer circuit 38 generates a reset signal. Thus, the write control unit 39 is brought into the set state by the output signal from the counter 36, and simultaneously, a start signal starts reading the data that is inputted to the CPU 37. The memory 34 is turned into a writable state by the write instruction signal outputted from the write control unit 39 in the set state, such that the memory 34 takes in the data read from the light receiving element 24b for storing the same data in the respective predetermined address one at a time. Also, according to the present modified embodiment, a prohibition time in which it is prohibited for read data to be taken into the memory and arranged by input of two pulses to the counter 36 within the time of the timer 38. Therefore, unnecessary read data can be prevented from being stored in the memory 34 at the slightest movement of the image sensor unit 21 immediately before the image sensor unit starts to be manually driven and immediately after the image sensor unit is manually driven while the unit is unstably held.

As is described above in detail, the image input processor of the fifth embodiment of the present invention is constructed so that the detection pulse outputted from the movement amount detection member while moving the image sensor unit, is counted by the counter. When the count number of the counter reaches a set value, the write instruction signal is outputted to store the read data in the memory. Accordingly, in spite of high analyzing precision of the movement amount detection member, it can be read data stored in the memory can be avoided when the image sensor unit is placed on the reading start position, and the unnecessary read data is stored in the memory while the image sensor unit is being moved some distance until it is angularly held stable on the data surface.

SIXTH EMBODIMENT

Figure 39:
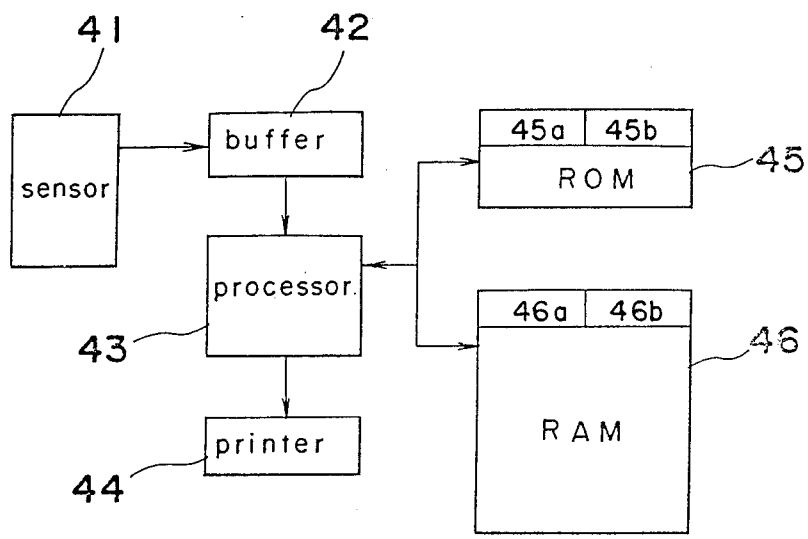
FIG. 39 is a block diagram of a copier to which the word processing system of the sixth embodiment of the present invention is applied.

FIG. 39 is a block diagram of a word processing system applied to a copier according to a sixth embodiment of the present invention.

A sensor unit 41 scans light over an original, and converts characters of the original into electric signals. The data read by the sensor unit 41 is temporarily stored in a temporary memory or a buffer 42. A processor 43 reads the data stored in the buffer 42 for writing data to the RAM 6. When printing, the processor 43 reads the data to be printed out of the memory 46 together with the data stored in the ROM 45 for control of printing, and sends the data to the printer 44 so that the printer 44 may print out the data.

How a word block is detected in the copier of the sixth embodiment of the present invention will be described hereinbelow.

Figure 40:
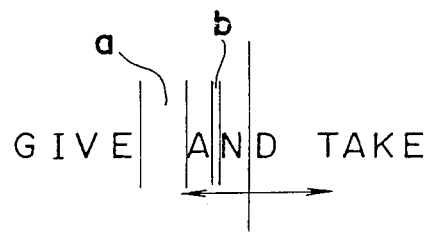
FIG. 40 is a view explanatory of the space judgement according to the word processing system of the sixth embodiment of the present invention.

With reference to an English sentence of FIG. 40, reference a is a space between two adjacent words, and reference b represents a space between two adjacent characters in a word. Generally, a formula a>>b is established. Therefore, if a detection level is set between the values of a and b, a word can be detected by the detection level for determining where the word starts and where the word ends. The English sentence can be processed by blocks of a word.

Figure 38:
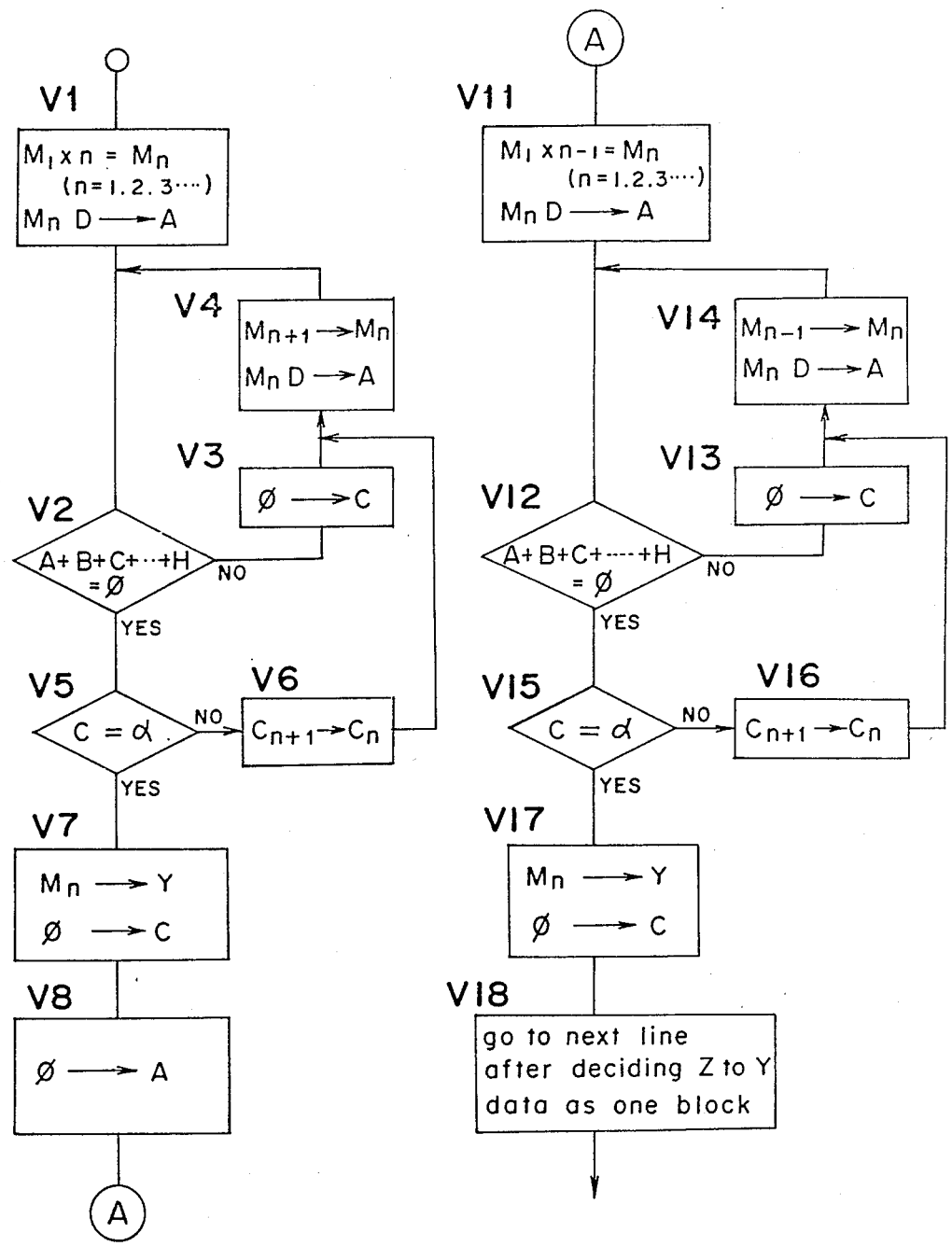
FIG. 38 is a flow-chart showing the space judging procedure in a word processing system according to a sixth embodiment of the present invention.

FIG. 38 is a flow-chart of a word detection procedure in the copier of the present invention.

Figure 41:
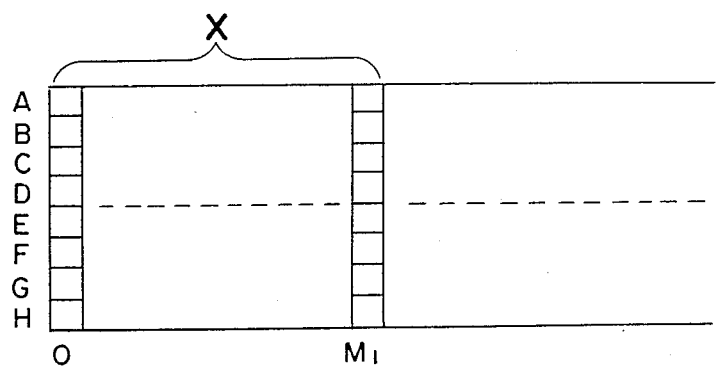
FIG. 41 is a view of a memory for storing the data in the word processing system of the sixth embodiment of the present invention.

According to the sixth embodiment of the present invention, a soft process is employed which will be explained by the use of an; 8-bit (A-H) memory shown in FIG. 41. This memory stores the largest printing width in a memory address M1. Portions to be processed into blocks of a word exist at M1×n (n=1, 2, 3, ...) points, namely, an integral multiple of M1 points.

First, Mn (n=1) data, MnD (n=1) is transferred to an A register (step V1). The A register is detected for whether or not each of the bits A-H in the data MnD are all zero so as to judge a space (V2). If there is not a space, the space width is set to be 0 (V3). Then, the data in the next upper address is transferred to the A register (V4), and the flow then returns to step V2, where the above-described detection is repeated in the same manner.

If a space is determined at step V2, then the number of bits in the same space (space width C) is detected for whether a predetermined value α (reached the predetermined value between a and b as illustrated in FIG. 40) (V5). When the number of bits in the space does not reach the predetermined value α, the space width D is increased. (V6), with the flow moving to step V4 in which the data in the next upper address is transferred to the A register again. Then the detection as described above is repeated.

If a space is determined at step V2, then the number of bits in the same space (space width C) is detected for whether a predetermined value α (is reached the predetermined value between a and b as illustrated in FIG. 40) (V5). When the number of the bits in the space does not reach the predetermined value α, the space width D is increased (V6), with the flow moving to step V4 in which the data in the next upper address is transferred to the A register again. Then the detection as described is repeated.

When the space width C is detected to become the predetermined value α, the memory address Mn when the space is detected to be the first space in the word is filed in the Y register, and the space width C is returned to be 0 (V7). Also, the A register is returned to be 0 (V8). Similarly, in steps V11-V16, data is checked sequentially from the address M1 to lower addresses. When the space width C is equal to the predetermined value α, the address at that time is filed in the Z register. The space width C returns to 0 (V7). Thus, in the above manner, the data between Z and Y can be recognized as one block of a word. In step V18, the data between Z and Y is determined as one word block, and the succeeding line is processed.

Hereinbelow, the reading and printing operations of the data will be described.

Supposing that the characters printed on an original as shown in FIG. 44 are desired to be read, a sensor reader unit 41 is scanned on the original from left to right. During that time, the printed characters reflect light (not shown), and accordingly the sensor receives the reflected light to convert it to data. This data which passes through the processor 43 is temporarily stored in the buffer 42 and written into the RAM 46 sequentially to be read as indicated in FIG. 42.

The printable number of dots in one line from the printer 44 are stored in address 45a of the ROM 45. It is detected whether the dot data (8 bits) corresponding to address M1 that is stored in address 45a (ⓐ in FIG. 42) is 0. The dot data is not 0 in this case because the data is a character, and the dot data in the address [(address stored in address 45a)+1] is judged. When the dot data is not 0, the address is further advanced to be detected one at a time. When the dot data is judged to be 0, the dot data is a space, and the printing width C is increased. Thereafter, the address is further increased one at a time, and the space C is counted. If there is character data before the space width C goes beyond the predetermined value α, a space between words is not detected, but the space between characters is detected. The space width C is returned to be 0. When the space continues α times (ⓑ in FIG. 42), it is detected to be the end of one word. The address at that time is stored in address 46a of the RAM 46.

Next, for searching the head of the word, the dot data of the address [(address stored in address 45a)−1] is judged. If the dot data is not 0, judgement of the dot data is repeated with respect to the address decreased one by at a time. When the data is detected to be 0 continually for the number of times stored in address 45b (ⓒ in FIG. 42), the data is then detected as the head of the word. The address of this data is stored in address 46b of the RAM 46.

The data from the first address to the address stored in the RAM 46 of the line (ⓒ in FIG. 42) is printed.

Then, the address stored in address 46b (ⓒ in FIG. 42) is moved to the address 46a. With reference to the address added with the printable number of dots in one line to the above address, both the end and the head of a word are detected similarly in the above-described manner. Then, the first address is written in address 46b, and the data from the address 46a to the address 46b is printed. The data in address 46b is moved to address 46a.

The repetition of the above-described procedure will avoid having a word that is cut off in the middle of the printing operation.

Although it is arranged in the foregoing embodiment that the end of a word as well as the head thereof is searched, the effects of the present invention can be realized by searching the head of the word only.

It is needless to say that the detection of the space width and the judgement of the space between words may be done by a hard process although such detection and judgement are carried out by a soft process in the foregoing embodiment.

As is described above, the present embodiment is effective for distinguishing the space between two adjacent words from the space between two adjacent characters in a word, because of the difference in the space width. Moreover, a word block can be detected.

Further, according to the present invention, such an inconvenience can be advantageously avoided so that a word may be interrupted halfway when a line is changed to a new line.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image input processor for reading a line of read character information contained within a reading width having a predetermined width and printing the read character information, comprising:
   character reading means for reading a plurality of characters from the line of the read character information;
   judging means for judging whether the height of at least one of said plurality of characters of the read character information within the reading width exceeds the predetermined width and comparing the portion of the read character information within the reading width of the line to a predetermined value; and
   printing means for printing the characters in the line of the read character information when the portion of the read character information within the reading width is over the predetermined value, and prohibiting the line of the read character information from being printed when the amount of the read character information within the predetermined width is below the predetermined value.

2. An image input processor for reading a plurality of characters contained in a plurality of lines of character information, storing the character information in a memory and printing the character information, comprising:
   character reading means for reading the plurality of characters contained in the plurality of lines of character information;
   storing means for sequentially storing addresses in said memory corresponding to the plurality of character information read by said character reading means; and
   processing means for removing addresses from said memory of blank information resulting from unnecessary information read at an end of the plurality of lines.

3. An image input processor for reading and storing a plurality of lines of character information in a memory and printing the character information, comprising:
   character reading means for reading the plurality of lines of character information;
   judgement means for judging whether the length of one of the plurality of lines of the character information read by said character reading means exceeds a predetermined printing width;
   search means for searching spaces of the character information and determining the largest space in the character information within a predetermined range from the end of said predetermined printing length when the length of one of the plurality of lines of the character information exceeds said predetermined printing length; and
   printing means for printing a portion of the character information on said one line and printing the remainder of said character information after the largest space on a new line.

4. An image input processor for reading and printing a plurality of lines of image information, comprising:
   image reading means for reading the plurality of lines of image information;
   first detection means for detecting whether one of the plurality of lines of the image information read by said image reading means corresponds to a first group of image information at an odd reading number or to a second group of image information at an even reading number;
   printing means for printing said first group of image information justified to a first boundary in respone to said odd reading number of said one line and printing said second group of image information justified to a second boundary in response to said even reading number of said one line detected by said first detection means; and
   second detection means for detecting whether the length of said one line of image information read by said image reading means exceeds a predetermined value, and dividing the image information into first and second image information portions each having lengths shorter than the predetermined value when the length of the image information is detected by said second detection means to exceed the predetermined value for printing said first and second image information portions from a position spaced a predetermined distance from said first boundary.

5. An image input processor comprising:
   image sensor means which is manually driven on a data surface, said image sensor means including,
      detection means for outputting a detection pulse corresponding to a movement of said image sensor means,
      data reading means for optically reading data on the data surface in response to said detection pulse;
   movement detection means for developing a number corresponding to said movement of said image sensor means in response to said detection pulse;
   write control means for outputting a write instruction signal when the number of said counter reaches a set value; and
   a memory for storing the data read by said data reading means in upon receipt of said write instruction signal outputted from said write control means and preventing data from being stored in said memory when said image sensor means moves less than said set value.

6. A word processing system comprising:
   scanning means for reading data from an original source;
   space detection means for detecting spaces between the data read by said scanning means; and
   space judgement means for judging whether each of said spaces detected by said space detection means distinguishes between two adjacent words in the data when said space exceeds a predetermined space width and distinguishes between two adjacent characters in the data when said space fails to exceed said predetermined space width.

7. A word processing system as claimed in claim 6, further comprising:
   block judgement means for judging whether data between two adjacent spaces which are judged by said space judgement means to be spaces between adjacent words and determining the data between said two adjacent spaces is a block forming one word when said spaces are judged to be between adjacent words.

8. A word processing system comprising:
   a scanner for reading a plurality of lines of data from an original source;
   a printer for printing out the data from said original source read by said scanner;
   space detection means for detecting spaces between the data read by said scanner;
   space judgement means for judging whether each of said spaces detected by said space detection means distinguishes between two adjacent words in the data when said space exceeds a predetermined space width and distinguishes between two adjacent characters in the data when said space fails to exceed said predetermined space width; and
   line control means for controlling said space detection means to detect said space between said two adjacent words contained in first and second consecutive lines of data, said first line is changed to said second line at said space when the data is printed by the printer.

* * * * *